United States Patent
Spangler (10) Patent No.: US 9,845,686 B2
(45) Date of Patent: *Dec. 19, 2017

(54) OVERLAPPING HERRINGBONE FILMHOLE PATTERNED AIRFOIL

(71) Applicant: UNITED TECHNOLOGIES CORPORATION, Hartford, CT (US)

(72) Inventor: Brandon W. Spangler, Vernon, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 272 days.

This patent is subject to a terminal disclaimer.

(21) Appl. No.: 14/707,875

(22) Filed: May 8, 2015

(65) Prior Publication Data

US 2016/0326882 A1    Nov. 10, 2016

(51) Int. Cl.
  *F01D 5/18*    (2006.01)
  *F01D 9/06*    (2006.01)

(52) U.S. Cl.
  CPC ............. *F01D 5/186* (2013.01); *F01D 9/065* (2013.01); *F05D 2240/121* (2013.01); *F05D 2240/303* (2013.01); *F05D 2260/202* (2013.01); *Y02T 50/672* (2013.01); *Y02T 50/676* (2013.01)

(58) Field of Classification Search
  CPC .......... F01D 5/186; F01D 5/187; F01D 9/065; F05D 2260/202; F05D 2240/121; F05D 2240/122; F05D 2240/303; F05D 2240/304; Y02T 50/676
  See application file for complete search history.

(56) References Cited

U.S. PATENT DOCUMENTS

| 3,527,543 A * | 9/1970 | Howald | F01D 5/186 |
| | | | 415/115 |
| 2013/0205786 A1* | 8/2013 | Kohli | F01D 5/186 |
| | | | 60/722 |
| 2014/0369852 A1* | 12/2014 | Zhang | F01D 5/187 |
| | | | 416/97 A |
| 2017/0044913 A1* | 2/2017 | Spangler | F01D 5/186 |

FOREIGN PATENT DOCUMENTS

| EP | 3059391 | 8/2016 | |
| WO | 2014007961 | 1/2014 | |
| WO | WO 2014007961 A1 * | 1/2014 | ............ F01D 5/186 |

OTHER PUBLICATIONS

Extended European Search Report dated Oct. 8, 2016 in European Application No. 16159276.1.

* cited by examiner

*Primary Examiner* — Nathaniel Wiehe
*Assistant Examiner* — Elton Wong
(74) *Attorney, Agent, or Firm* — Snell & Wilmer L.L.P.

(57) ABSTRACT

An airfoil having an overlapping herringbone filmhole pattern is disclosed. For instance, the airfoil may have filmholes arranged in filmrows, each filmrow divided into groups of filmholes. A first group may be oriented to direct cooling air generally radially outward over a surface of the airfoil and a second group may be oriented to direct cooling air generally radially inward over a surface of the airfoil. Between the first group and the second group of filmholes in each filmrow, a transition region exists. A transition region filmrow group may be disposed within the transition region and may be co-linear with or staggered relative to the first group and/or the second group. In this manner, the transition region filmrow group enhances the effectiveness of the cooling proximate to the transition region.

19 Claims, 10 Drawing Sheets

OVERLAPPING HERRINGBONE FILMHOLE PATTERNED AIRFOIL

STATEMENT REGARDING GOVERNMENT RIGHTS

This disclosure was made with government support under FA-8650-09-D-2923-0021 awarded by the United States Air Force. The government has certain rights in the disclosure.

FIELD

The present disclosure relates generally to airfoils for gas turbine engine, and more specifically, to an airfoil having an overlapping herringbone filmhole pattern.

BACKGROUND

In a gas turbine engine, rotor and/or stator airfoils have filmholes in their surfaces to allow cooling air to pass from cavities inside the airfoil and out through the filmholes, cooling the airfoil. Groups of filmholes may point in different directions. However, because the filmholes point in different directions, areas of the airfoil may not receive cooling air. Such areas may be insufficiently cooled and subject to early wear and/or failure.

SUMMARY

An airfoil is disclosed. The airfoil may include an overlapping herringbone filmhole pattern, wherein the overlapping herringbone filmhole pattern has a first filmrow including a first radially outward facing portion, a first radially inward facing portion, a first transition region, and a first transition region filmhole group. The first radially outward portion may include filmholes oriented to direct cooling air leaving the filmholes radially outward of an engine central longitudinal axis and over a surface of the airfoil. The first radially inward facing portion may include filmholes oriented to direct cooling air leaving the filmholes radially inward toward the engine central longitudinal axis and over the surface of the airfoil. The first transition region may include a first region at least one of equidistant from distal ends, and centered relative to mesial ends, or radially overlapping the mesial ends of the first radially outward facing portion and the first radially inward facing portion. The first transition region filmhole group may be located in the first transition region, wherein the first transition region filmhole group includes filmholes oriented to direct cooling air leaving the filmholes one of radially outward or radially inward relative to the engine central longitudinal axis and over the surface of the airfoil. The first transition region filmhole group may be collinear with the first radially outward facing portion. The first transition region filmhole group may be collinear with the first radially inward facing portion. The first transition region filmhole group may be proximate to the first radially inward and first radially outward facing portion and centered about the mesial ends of the first radially outward facing portion and the first radially inward facing portion.

In various embodiments, a first radially outward facing portion group alignment line is defined through a center of each filmhole of the first radially outward facing portion, a first radially inward facing portion group alignment line is defined through a center of each filmhole of the first radially inward facing portion, and a first transition region filmhole group alignment line is defined through a center of each filmhole of the first transition region filmhole group. The first radially inward facing portion group alignment line is at least one of parallel to and concentric with the first radially outward facing portion group alignment line, and the first transition region filmhole group alignment line is coincident with the first radially inward facing portion group alignment line and is at least one of parallel to and concentric with the first radially outward facing portion group alignment line. In various embodiments, the first transition region filmhole group alignment line is coincident with the first radially outward facing portion group alignment line and is at least one of parallel to and concentric with the first radially inward facing portion group alignment line. In various embodiments, the first transition region filmhole group alignment line is parallel with the first radially outward facing portion group alignment line and is at least one of parallel to and concentric with the first radially inward facing portion group alignment line. The airfoil may be a stator vane. The airfoil may be a rotor blade.

An airfoil is disclosed. The airfoil may include an overlapping herringbone filmhole pattern, the overlapping herringbone filmhole pattern having a plurality of filmrows, each filmrow including a radially inward facing portion, a radially outward facing portion. The radially outward portion may be staggered relative to the radially inward facing portion. The radially outward portion may be collinear with the radially inward facing portion. A transition region filmhole group may be collinear with at least one of the radially outward facing portion and the radially inward facing portion. A transition region filmhole group may be proximate to the radially outward facing portion and the radially inward facing portion and centered about the mesial ends of the first radially outward facing portion and the first radially inward facing portion.

A method of forming an airfoil having an overlapping herringbone filmhole pattern in the airfoil is disclosed. The method may encompass forming a first radially outward facing portion having filmholes oriented to direct cooling air leaving the filmholes radially outward of an engine central longitudinal axis and over a surface of the airfoil, forming a first radially inward facing portion including filmholes oriented to direct cooling air leaving the filmholes radially inward toward the engine central longitudinal axis and over the surface of the airfoil, and forming a first transition region filmhole group. The first transition region filmhole group may be collinear with at least one of the first radially outward facing portion and the first radially inward facing portion. The first transition region filmhole group may be proximate to the first radially outward facing portion and the first radially inward facing portion and centered about the mesial ends of the first radially outward facing portion and the first radially inward facing portion. The first transition region filmhole group may be located in a first transition region, wherein the first transition region filmhole group has filmholes oriented to direct cooling air leaving the filmholes one of radially outward or radially inward relative to the engine central longitudinal axis and over the surface of the airfoil. The first transition region may include a first region equidistant from mesial ends of the first radially outward facing portion and the first radially inward facing portion.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "pressure side" of an airfoil means the side of the airfoil having a shorter length and/or proximate to slower moving fluid and/or fluid at higher pressure as compared to the "suction side" of the airfoil. "Suction side" of an airfoil means the side of the airfoil having a longer length and/or proximate to faster moving fluid and/or fluid at a lower pressure as compared to the "pressure side" of the airfoil.

Figure 1:
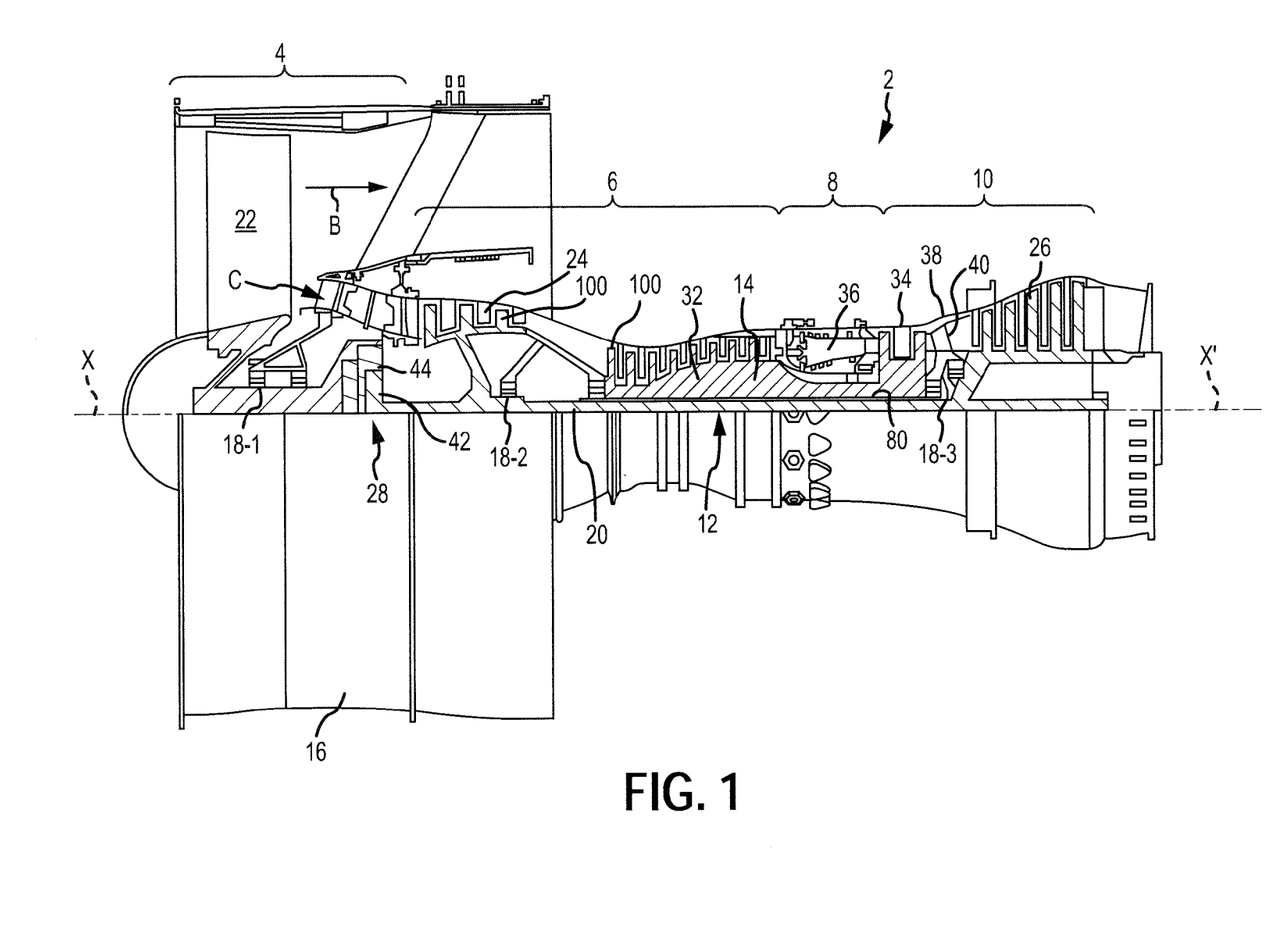
FIG. 1 illustrates a cross-sectional view of an exemplary gas turbine engine, according to various embodiments.
Figure 2:
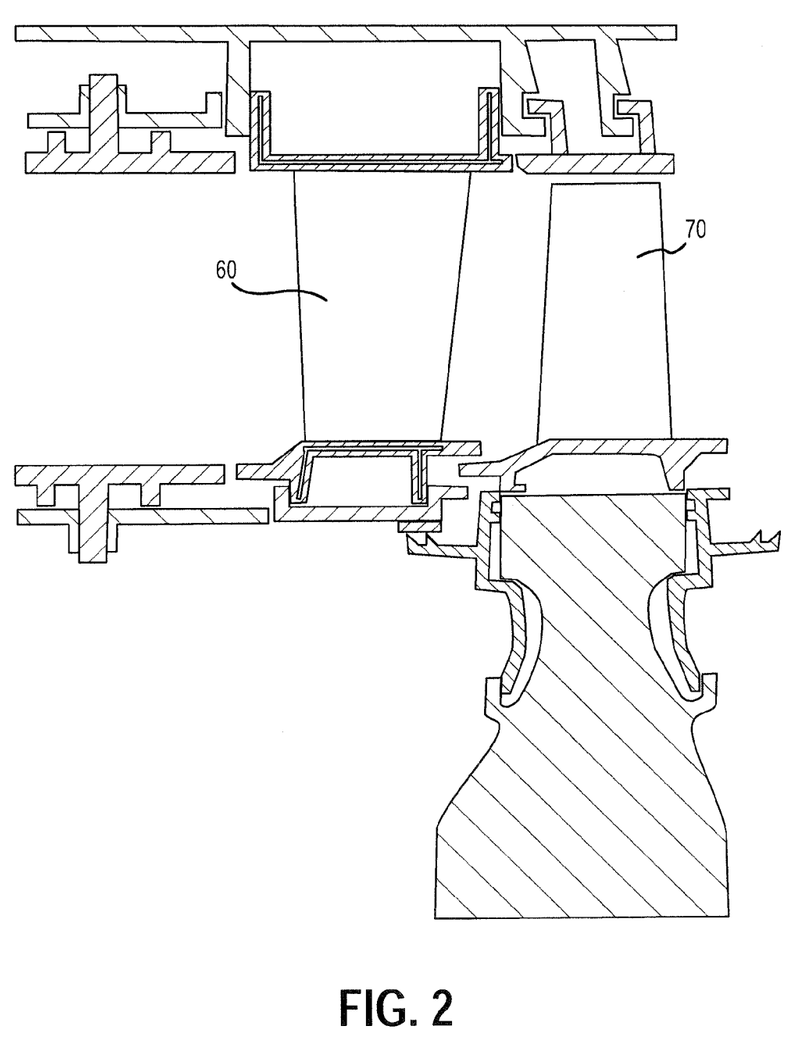
FIG. 2 illustrates example airfoils including a rotor and a stator, according to various embodiments.

With reference to FIGS. 1 and 2, an exemplary gas turbine engine 2 is provided. Gas turbine engine 2 is a two-spool turbofan that generally incorporates a fan section 4, a compressor section 6, a combustor section 8 and a turbine section 10. Alternative engines include, for example, an augmentor section among other systems or features. In operation, fan section 4 drives air along a bypass flow-path B while compressor section 6 drives air along a core flow-path C for compression and communication into combustor section 8 then expansion through turbine section 10. Although depicted as a turbofan gas turbine engine 2 herein, it should be understood that the concepts described herein are not limited to use with turbofans as the teachings is applicable to other types of turbine engines including three-spool architectures.

Gas turbine engine 2 generally comprises a low speed spool 12 and a high speed spool 14 mounted for rotation about an engine central longitudinal axis X-X' relative to an engine static structure 16 via several bearing systems 18-1, 18-2, and 18-3. It should be understood that bearing systems is alternatively or additionally provided at locations, including for example, bearing system 18-1, bearing system 18-2, and bearing system 18-3.

Low speed spool 12 generally comprises an inner shaft 20 that interconnects a fan 22, a low pressure compressor section 24, e.g., a first compressor section, and a low pressure turbine section 26, e.g., a second turbine section. Inner shaft 20 is connected to fan 22 through a geared architecture 28 that drives the fan 22 at a lower speed than low speed spool 12. Geared architecture 28 comprises a gear assembly 42 enclosed within a gear housing 44. Gear assembly 42 couples the inner shaft 20 to a rotating fan structure. High speed spool 14 comprises an outer shaft 80 that interconnects a high pressure compressor section 32, e.g., second compressor section, and high pressure turbine section 34, e.g., first turbine section. A combustor 36 is located between high pressure compressor section 32 and high pressure turbine section 34. A mid-turbine frame 38 of engine static structure 16 is located generally between high pressure turbine section 34 and low pressure turbine section 26. Mid-turbine frame 38 supports one or more bearing systems 18, such as 18-3, in turbine section 10. Inner shaft 20 and outer shaft 80 is concentric and rotates via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 is, for example, a high-bypass geared aircraft engine. The bypass ratio of gas turbine engine 2 is optionally greater than about six (6). The bypass ratio of gas turbine engine 2 is optionally greater than ten (10). Geared architecture 28 is an epicyclic gear train, such as a star gear system, e.g., sun gear in meshing engagement with a plurality of star gears supported by a carrier and in meshing engagement with a ring gear, or other gear system. Geared architecture 28 has a gear reduction ratio of greater than about 2.3 and low pressure turbine section 26 has a pressure ratio that is greater than about 5. The bypass ratio of gas turbine engine 2 is greater than about ten (10:1). The diameter of fan 22 is significantly larger than that of the low pressure compressor section 24, and the low pressure turbine section 26 has a pressure ratio that is greater than about 5:1. Low pressure turbine section 26 pressure ratio is measured prior to inlet of low pressure turbine section 26 as related to the pressure at the outlet of low pressure turbine section 26 prior to an exhaust nozzle. It should be understood, however, that the above parameters are exemplary of a suitable geared architecture engine and that the present disclosure contemplates other turbine engines including direct drive turbofans.

The next generation of turbofan engines is designed for higher efficiency, which is associated with higher pressure ratios and higher temperatures in the high speed spool 14 and other engine sections. These higher operating temperatures and pressure ratios create operating environments that cause thermal loads that are higher than thermal loads conventionally encountered. Operating conditions in high pressure compressor section 32 are often approximately 1400° F. (approximately 760° C.) or more, and operating conditions in combustor 36 are often higher. Moreover, prior filmhole arrangements permit regions of localized temperature excursions, such as due to regions that are insufficiently cooled due to the orientation of the filmholes. Various systems to address these challenges are presented herein.

Airfoils may have filmholes arranged in rows and each row may have at least one filmhole pointing in a radially outward direction and at least one filmhole pointing in a radially inward direction relative to the engine central longitudinal axis. Various regions of the airfoil, such as the leading edge, rely on the convection in the filmhole to reduce temperature of the airfoil and/or other proximate structures; however, multiple rows of filmholes often transition from groups of filmholes pointing radially outwardly and groups of filmholes pointing radially inwardly at various positions. As such, by intentionally staggering the transition of multiple rows of filmholes from groups pointing radially outward and groups pointing radially inward the effectiveness of the convective cooling proximate to the transitions may be enhanced.

Stated differently, the present disclosure contemplates considering filmhole positioning. For instance, for filmholes arranged in rows ("filmrows"), each filmrow is divided into groups of filmholes. A first group may be oriented to direct cooling air leaving the filmhole generally radially outward relative to the engine central longitudinal axis over a surface of the airfoil, whereas a second group may be oriented to direct cooling air leaving the filmhole generally radially inward relative to the engine central longitudinal axis and over a surface of the airfoil 100. Between the first group and the second group of filmholes in each filmrow, a transition region exists. The transition region is the space between the first group and the second group where the holes transition from pointing outward to pointing inward, resulting in diminished cooling coming from these two groups of filmholes. For instance, the transition region is bounded at one end by filmholes oriented to direct cooling air leaving the filmholes generally radially outward relative to the engine central longitudinal axis over a surface of the airfoil and at the other end by filmholes oriented to direct cooling air leaving the filmholes generally radially inward relative to the engine central longitudinal axis over a surface of the airfoil. Each group of filmholes may define a group alignment line that extends through the center of each filmhole of the group of filmholes.

Thus, one may intentionally stagger the second group of filmholes so that first group alignment line of the first group of filmholes does not coincide with the second group alignment line of the second group of filmholes. A filmrow may include a third group of filmholes, the transition region filmhole group. In one embodiment, the transition region filmhole group has a group alignment line that coincides with the group alignment line of one of the first group of filmholes and the second group of filmholes. At least one filmhole of the transition region filmhole group is positioned inward of an orthogonal line to the group alignment line that is not coincident with the group alignment line of the transition region filmhole group, the orthogonal line coinciding with the center of a filmhole along the group alignment line that is not coincident with the group alignment line of the transition region filmhole group In other words, the transition region filmhole group contains holes that radially overlap one of the first and second group of filmholes. The transition region filmhole group may include filmholes that are radially outward of the innermost hole of one of the first and second group of filmholes, and also radially inward of the outermost hole of the other of the first and second group of filmholes. In this manner, the transition region filmhole group may overlap one or both of the first and second group of filmholes.

In further embodiments, the second group of filmholes is collinear with the first group of filmholes so that first group alignment line of the first group of filmholes coincides with the second group alignment line of the second group of filmholes. A filmrow may include a third group of filmholes, the transition region filmhole group. The transition region filmhole group has a group alignment line that is staggered relative to the group alignment line of both of the first group of filmholes and the second group of filmholes. At least one filmhole of the transition region filmhole group is positioned inward and at least one filmhole of the transition region filmhole group is positioned outward of a line coincident with the center of a transition region and orthogonal to the group alignment line of the first group of filmholes and/or the second group of filmholes. As such, the transition region filmhole group is proximate to the first group of filmholes and the second group of filmholes and centered about mesial ends of the first group of filmholes and the second group of filmholes, resulting in the transition region filmhole group radially overlapping the first and second filmhole groups. In further embodiments, the transition region filmhole group is overlapping the mesial ends of the first group of filmholes and the second group of filmholes, but is not centered about mesial ends of the first group of filmholes and the second group of filmholes.

Staggering of the first group of filmholes and the second group of filmholes of a filmrow and implementation of a transition region filmhole group aligned with one of the first group or second group of filmholes tends to enhance the effectiveness of the cooling proximate to the transition region of the filmrow by permitting the cooling air flowing from the transition region filmhole group to convectively cool the transition region and/or provide additional film to the transition region.

Similarly, aligning of the first group of filmholes and the second group of filmholes, and implementation of a transition region filmhole group staggered relative to the first group or second group of filmholes tends to enhance the effectiveness of the cooling proximate to the transition region of the filmrow by permitting the cooling air flowing from the transition region filmhole group to convectively cool the transition region and/or provide additional film to the transition region.

With reference to FIGS. 1 and 2, an airfoil 100 of an engine 2 may comprise a rotor blade 70 or a stator vane 60. While various aspects are described herein with reference to stator vanes 60, such as overlapping herringbone filmhole pattern 52 (with brief reference to FIGS. 3A-4D), such aspects may be incorporated into rotor blades 70 in lieu of or in addition to stator vanes 60, as desired, and may be positioned on the leading edge, pressure side, and/or suction side of the airfoil 100.

Figure 3A:
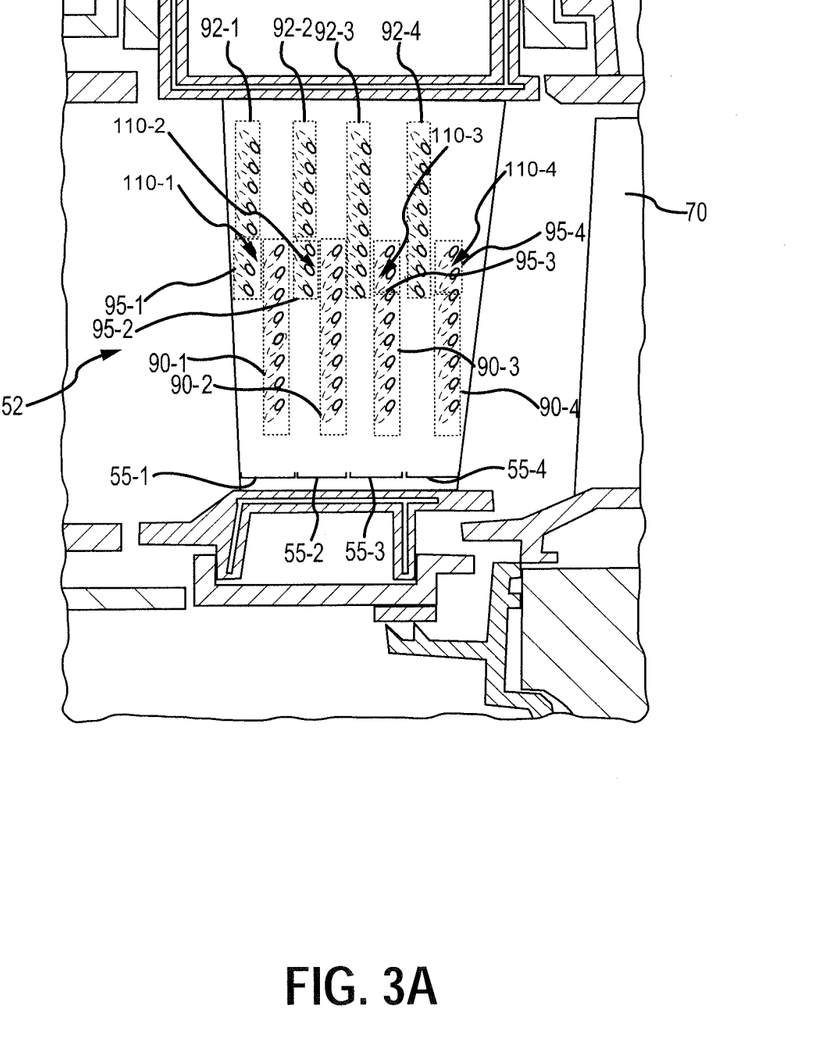
FIG. 3A illustrates an example airfoil having an overlapping herringbone filmhole pattern, according to various embodiments.
Figure 3B:
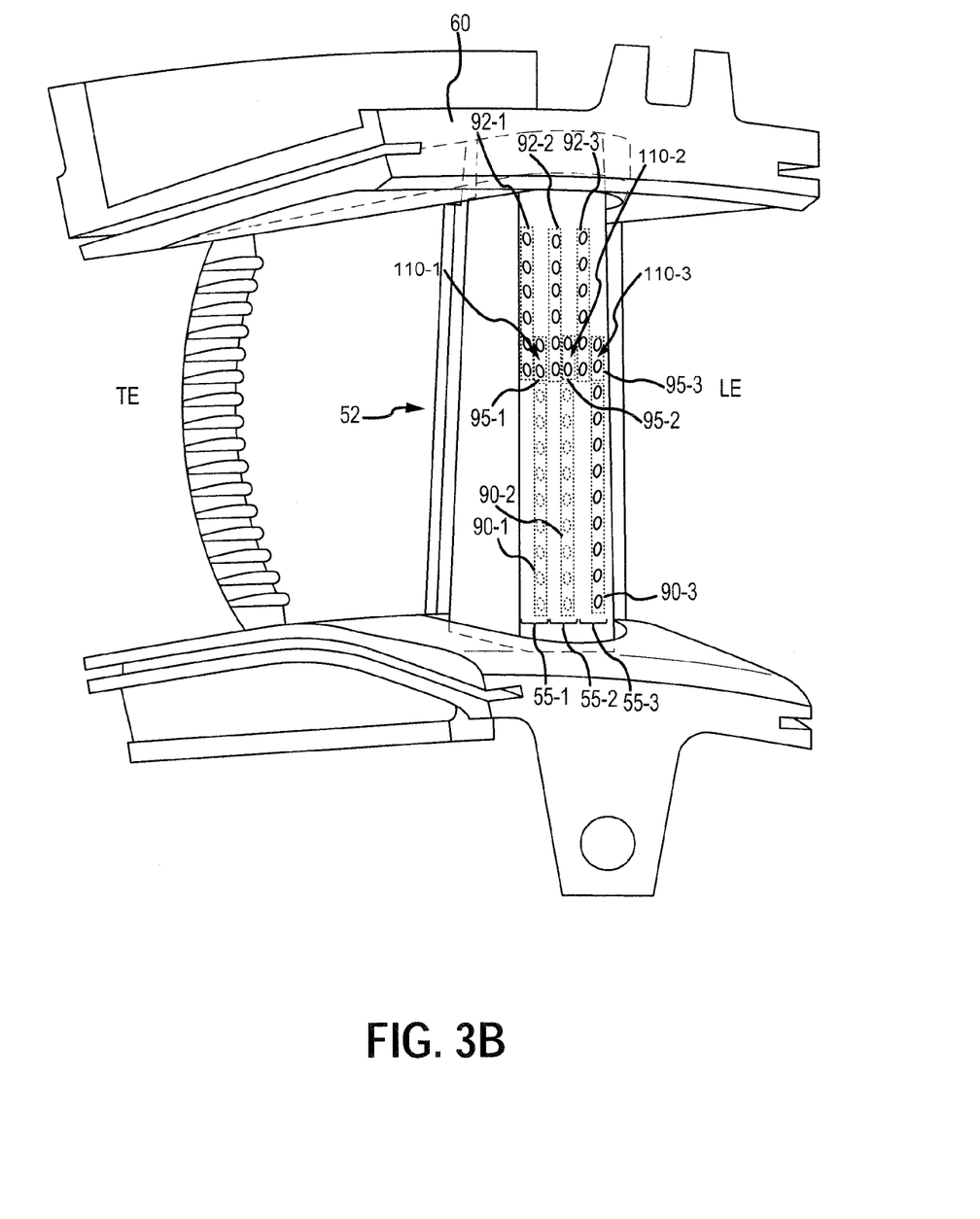
FIG. 3B illustrates an example airfoil having an overlapping herringbone filmhole pattern on a leading edge of the example airfoil, according to various embodiments.
Figure 3C:
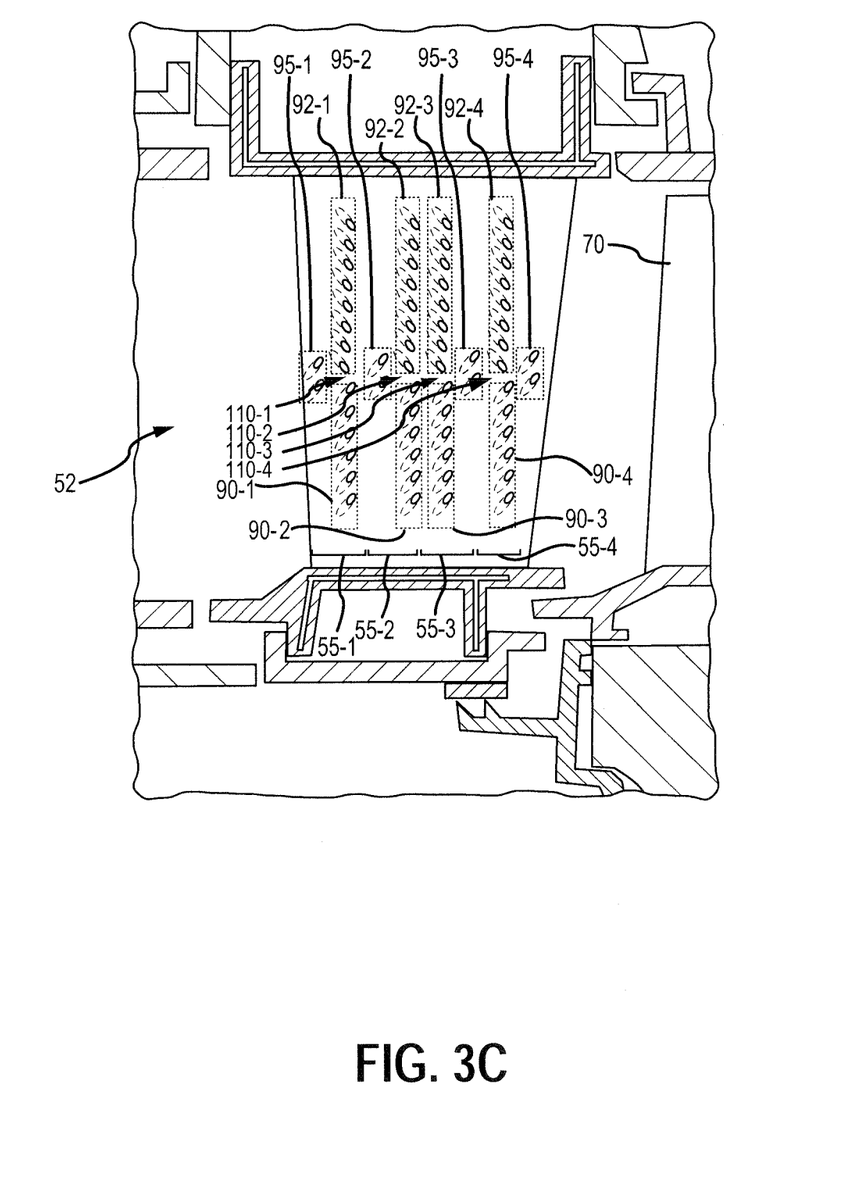
FIG. 3C illustrates an example airfoil having an overlapping herringbone filmhole pattern with a transition region filmhole group proximate to a radially outward facing portion and a radially inward facing portion and overlapping the mesial ends of the first radially outward facing portion and the first radially inward facing portion, according to various embodiments.
Figure 3D:
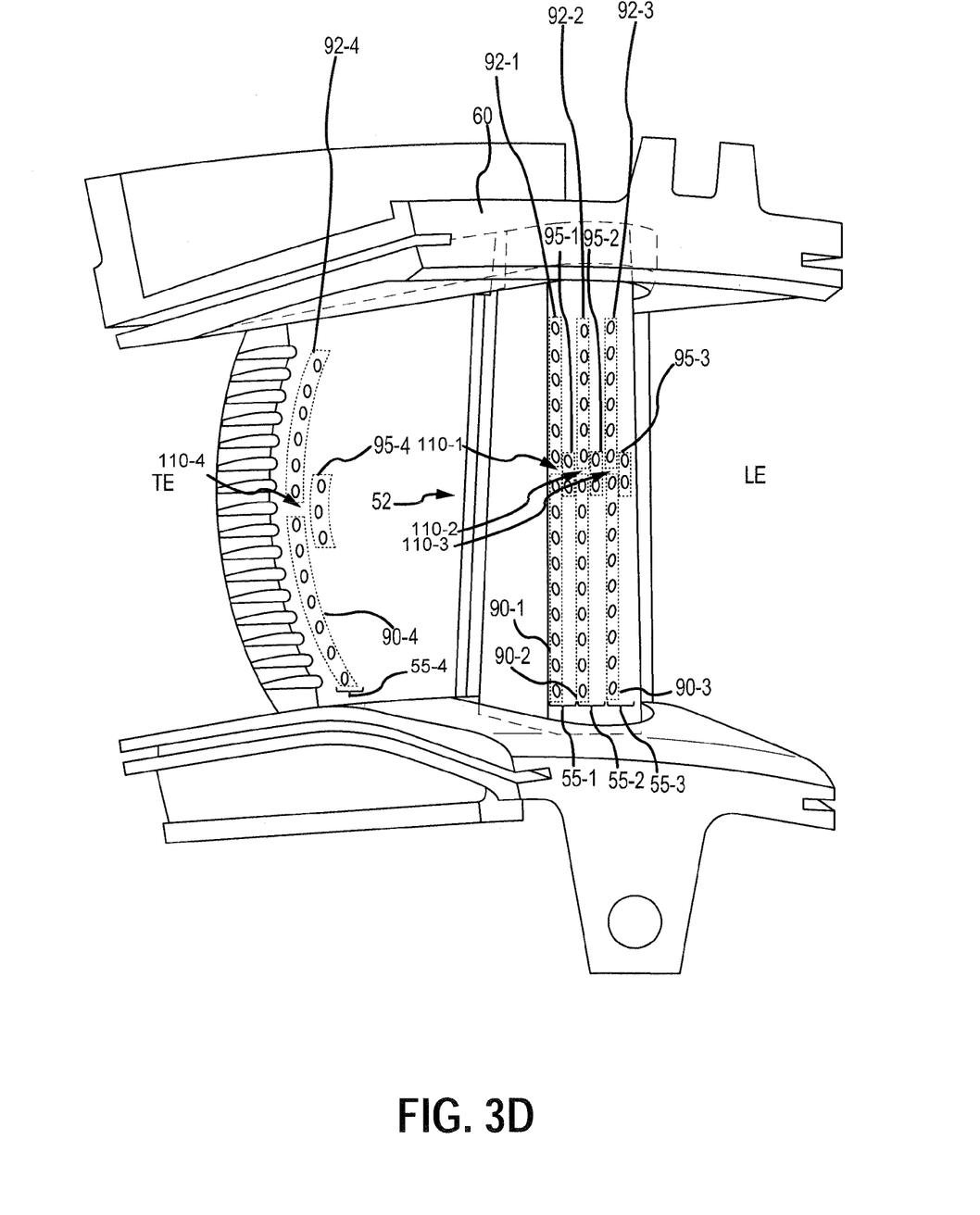
FIG. 3D illustrates an example airfoil having an overlapping herringbone filmhole pattern on a leading edge of the example airfoil with a transition region filmhole group proximate to a radially outward facing portion and a radially inward facing portion and overlapping the mesial ends of the first radially outward facing portion and the first radially inward facing portion, according to various embodiments, and an example overlapping herringbone filmhole pattern on a trailing edge of the example airfoil.
Figure 4A:
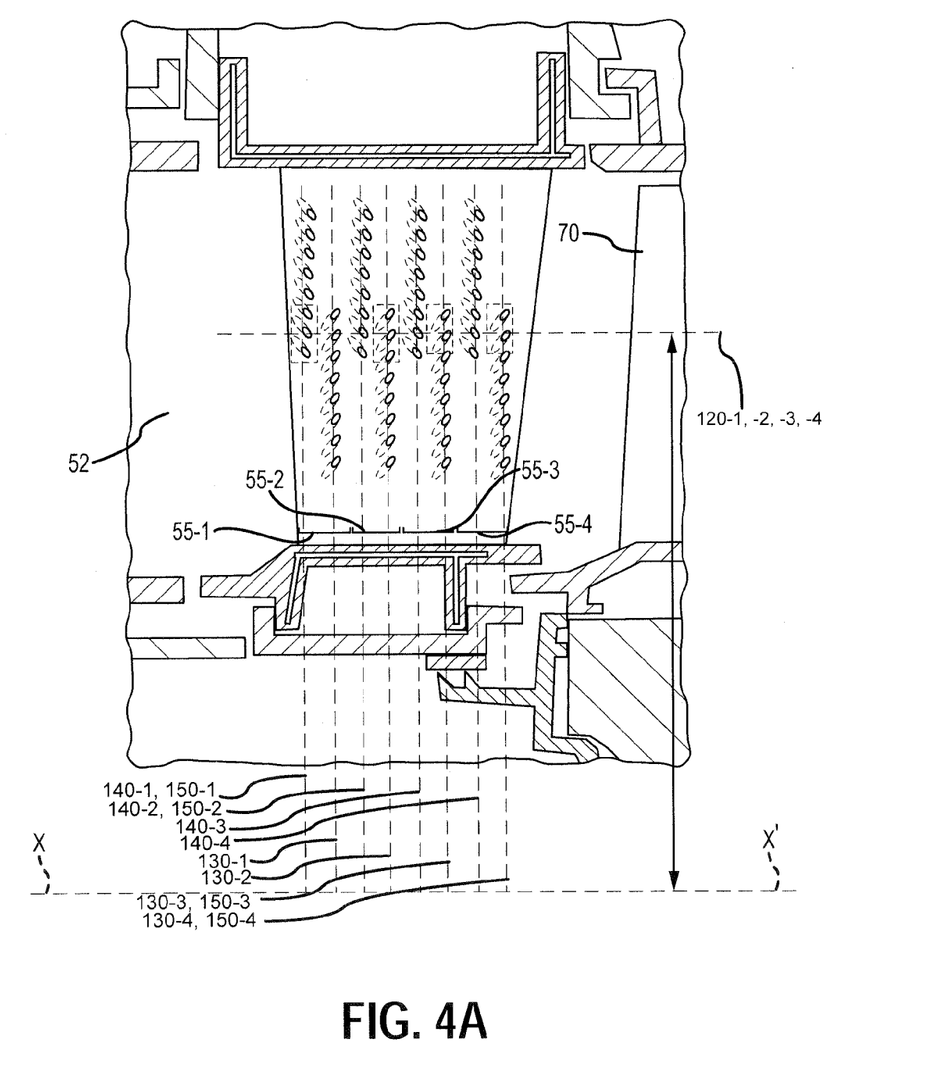
FIG. 4A illustrates an example airfoil having an overlapping herringbone filmhole pattern according to FIG. 3A, with emphasis on various group alignment lines and transition region radial positions, according to various embodiments.
Figure 4B:
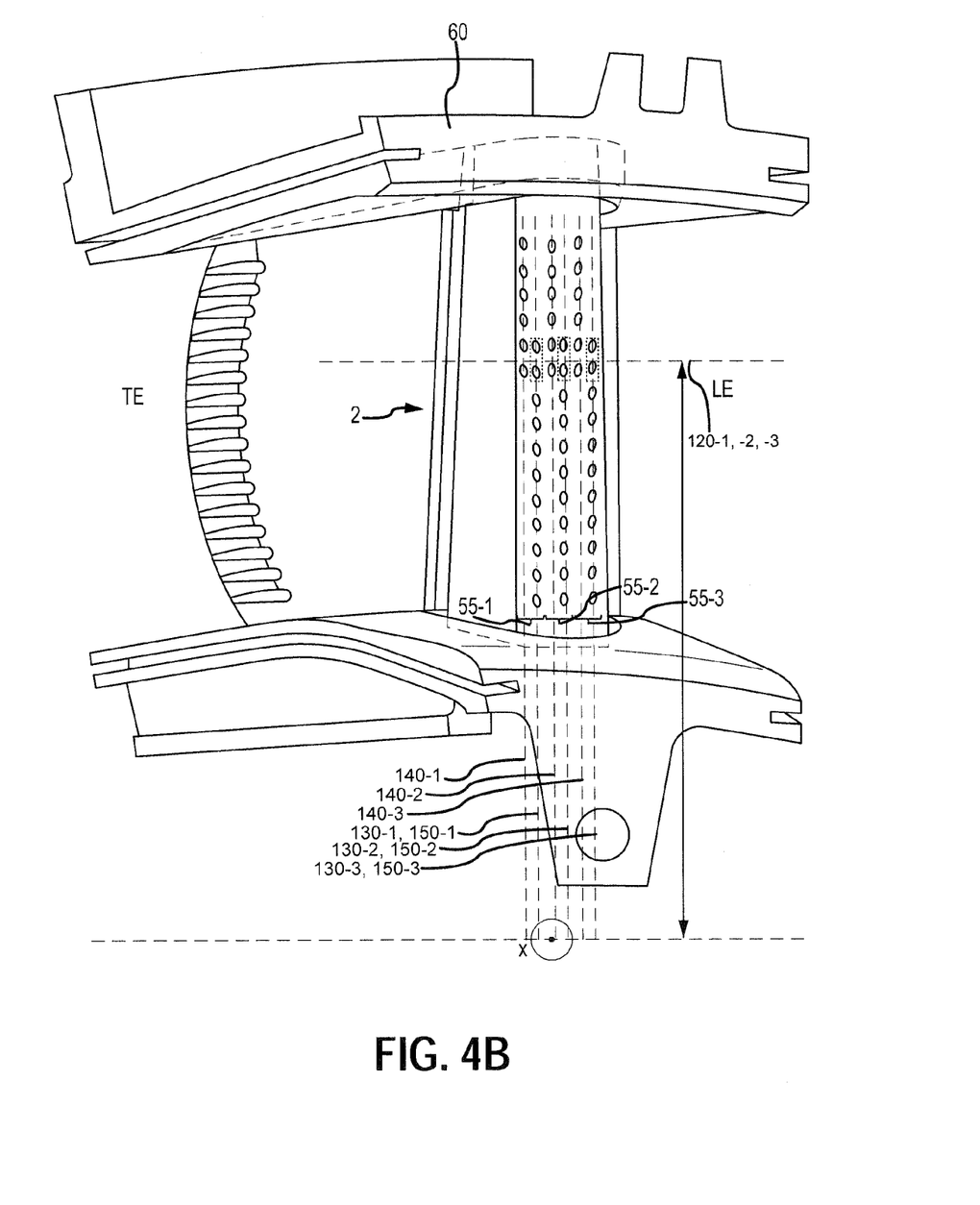
FIG. 4B illustrates an example airfoil having an overlapping herringbone filmhole pattern on a leading edge of the example airfoil according to FIG. 3B and with emphasis on various group alignment lines and transition region radial positions, according to various embodiments.
Figure 4C:
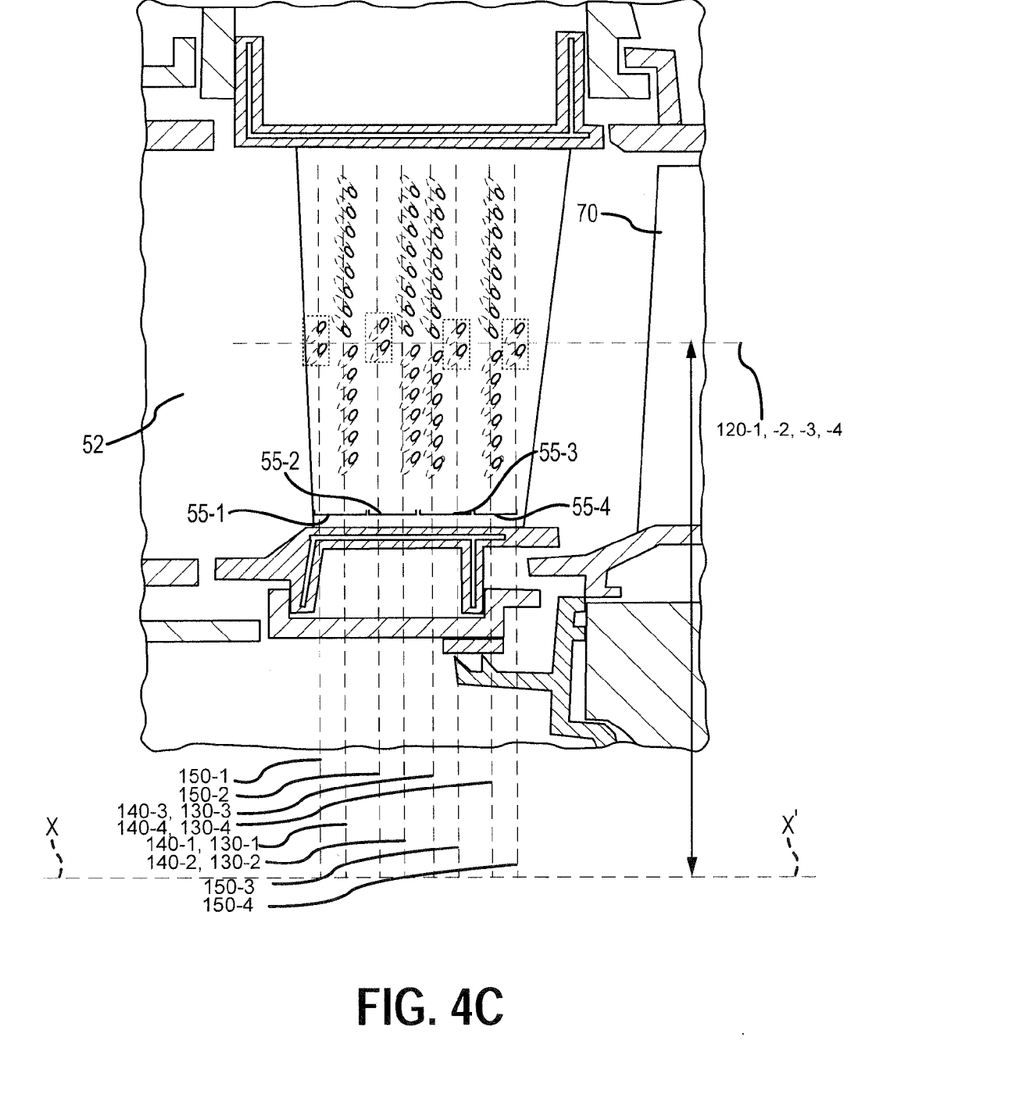
FIG. 4C illustrates an example airfoil having an overlapping herringbone filmhole pattern according to FIG. 3C, with emphasis on various group alignment lines and transition region radial positions, according to various embodiments.
Figure 4D:
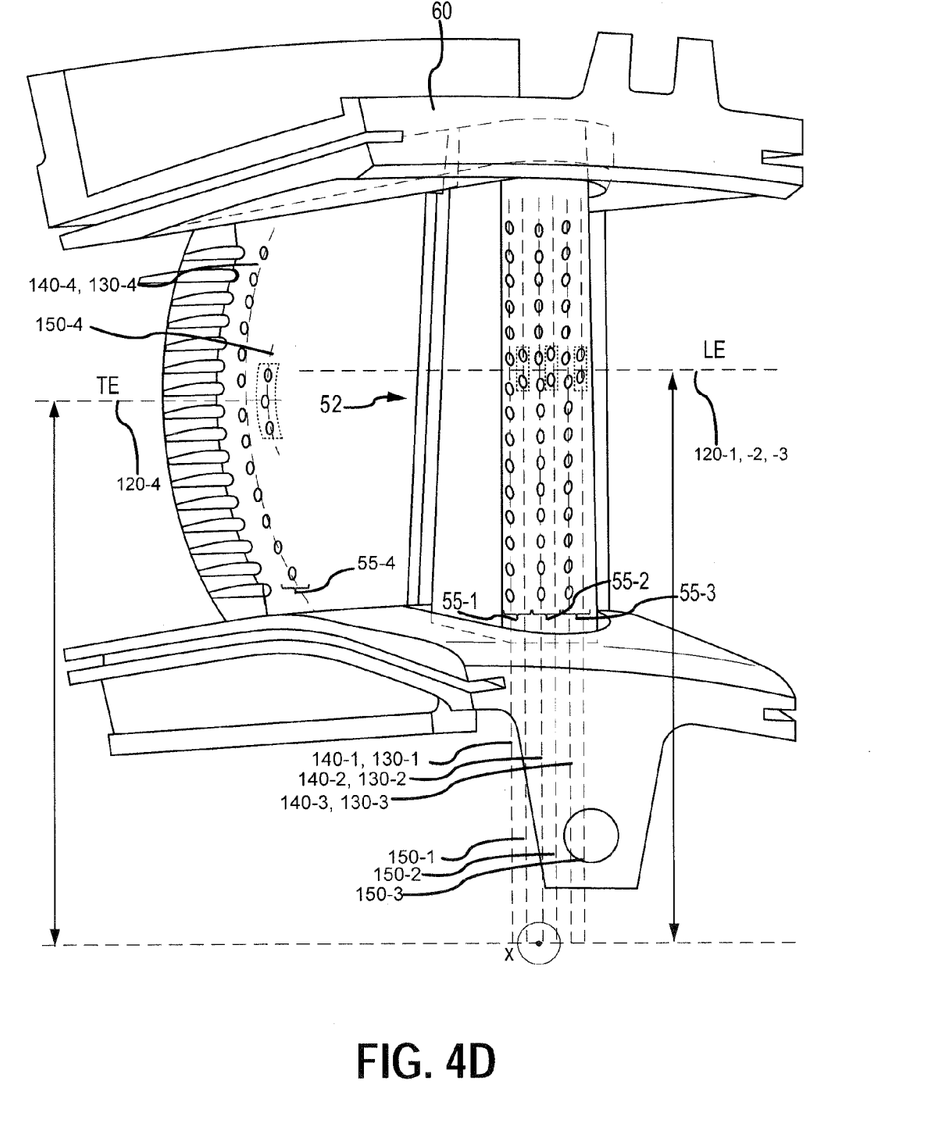
FIG. 4D illustrates an example airfoil having an overlapping herringbone filmhole pattern on a leading edge of the example airfoil according to FIG. 3D and with emphasis on various group alignment lines and transition region radial positions, according to various embodiments.

With reference now to FIGS. 2, 3A-4D, an overlapping herringbone filmhole pattern 52 is disclosed. In various embodiments the overlapping herringbone filmhole pattern 52 may comprise an arrangement of filmholes into filmrows 55 configured to cool the airfoil 100. For instance, the overlapping herringbone filmhole pattern 52 may comprise one or more filmrows 55. The overlapping herringbone filmhole pattern 52 may comprise a first filmrow 55-1, a second filmrow 55-2, a third filmrow 55-3, and a fourth filmrow 55-4 (FIG. 3A). While four filmrows are depicted in FIGS. 3A, 3C and three filmrows are depicted in FIGS. 3B, 3D with a fourth filmrow 55-4 disposed near the trailing edge of the airfoil for illustration purposes, one may appreciate that any number of filmrows configured to accomplish a desired cooling on a desired airfoil may be implemented, and any grouping of film rows may comprise linear arrangements (such as filmrows 55-1, 55-2, and 55-3 of FIG. 3D) and may comprise arcuate or otherwise non-linear arrangements (such as filmrow 55-4 of FIG. 3D).

Each filmrow 55-1, 55-2, 55-3, 55-4 may comprise a radially outward facing portion 90 (e.g., "first group of filmholes") and a radially inward facing portion 92 (e.g., "second group of filmholes"). For instance, the filmholes of each filmrow may be arranged into a row with filmholes oriented to direct cooling air from a channel inside the airfoil through and out of the surface of the airfoil. Relative to the engine central longitudinal axis (e.g., geometric center of a cross-sectional plane of the engine 2 bisecting the stator vane 60), the radially outward facing portion 90 may comprise filmholes oriented to direct cooling air generally radially outward from the engine central longitudinal axis. Similarly, the radially inward facing portion 92 may comprise filmholes oriented to direct cooling air generally radially inward toward the engine central longitudinal axis. Furthermore, each filmrow 55-1, 55-2, 55-3, and 55-4 may further comprise a transition region filmhole group 95 (e.g., "third group of filmholes") made up of filmholes that overlap at least one of the first and second group of holes. The transition region filmhole group 95 may be arranged into a row with filmholes oriented to direct cooling air from a channel inside the airfoil through and out of the surface of the airfoil generally toward the corresponding transition region 110-1, 110-2, 110-3, or 110-4. As used herein, a row may comprise a linear arrangement. In further embodiments, as used herein, a row may comprise an arcuate arrangement, or a compound curve, or any non-linear arrangement as desired.

Because each filmrow 55-1, 55-2, 55-3, 55-4 may comprise a radially outward facing portion 90 and a radially inward facing portion 92 and a transition region filmhole group 95, the first filmrow 55-1 may comprise a first radially outward facing portion 90-1 and a first radially inward facing portion 92-1 and a first transition region filmhole group 95-1, the second filmrow 55-2 may comprise a second radially outward facing portion 90-2 and a second radially inward facing portion 92-2 and a second transition region filmhole group 95-2, the third filmrow 55-3 may comprise a third radially outward facing portion 90-3 and a third radially inward facing portion 92-3 and a third transition region filmhole group 95-3, and the fourth filmrow 55-4 may comprise a fourth radially outward facing portion 90-4 and a fourth radially inward facing portion 92-4 and a fourth transition region filmhole group 95-4.

Each filmrow 55-1, 55-2, 55-2, 55-4 may further comprise a transition region. For example, first filmrow 55-1 may comprise a first transition region 110-1, second filmrow 55-2 may comprise a second transition region 110-2, third filmrow 55-3 may comprise a third transition region 110-3 and forth filmrow 55-4 may comprise a fourth transition region 110-4. A transition region may comprise a region at least one of radially equidistant from distal ends and radially centered relative to mesial ends of a radially outward facing portion of a filmrow and a radially inward facing portion of the same filmrow and having the transition region filmhole group of the filmrow disposed therein. A transition region may comprise a region radially overlapping a portion of one or more of the radially outward facing portion and radially inward facing portion of a filmrow and having the transition region filmhole group of the filmrow disposed therein. For instance, first transition region 110-1 may be a region at least one of radially equidistant from distal ends and radially centered relative to mesial ends of first radially inward facing portion 92-1 and first radially outward facing portion 90-1 of the first filmrow 55-1 and/or radially overlapping a portion of first radially inward facing portion 92-1 and/or first radially outward facing portion 90-1. Second transition region 110-2 may be a region at least one of radially equidistant from distal ends and radially centered relative to mesial ends of second radially inward facing portion 92-2 and second radially outward facing portion 90-2 of the second filmrow 55-2 and/or radially overlapping a portion of second radially inward facing portion 92-2 and/or second radially outward facing portion 90-2. Third transition region 110-3 may be a region at least one of radially equidistant from distal ends and radially centered relative to mesial ends of third radially inward facing portion 92-3 and third radially outward facing portion 90-3 of the third filmrow 55-3 and/or radially overlapping a portion of third radially inward facing portion 92-3 and/or third radially outward facing portion 90-3. Fourth transition region 110-4 may be a region at least one of radially equidistant from distal ends and radially centered relative to mesial ends of fourth radially inward facing portion 92-4 and fourth radially outward facing portion 90-4 of the fourth filmrow 55-4 and/or radially overlapping a portion of fourth radially inward facing portion 92-4 and/or fourth radially outward facing portion 90-4.

With continued reference to both FIGS. 3A-D and 4A-D, each filmrow may comprise a transition region radial position. For example, first filmrow 55-1 may comprise a first transition region radial position 120-1, second filmrow 55-2 may comprise a second transition region radial position 120-2, third filmrow 55-3 may comprise a third transition region radial position 120-3 and fourth filmrow 55-4 may comprise a fourth transition region radial position 120-4. A transition region radial position may comprise the radial distance of the center of the corresponding transition region from the engine central longitudinal axis. Different transition regions may have different transition region radial positions, or may have the same transition region radial position. In various embodiments, a transition region radial position may comprise an arcuate alignment line, such as may have a point of inflection at the center of the transition region.

With reference to FIGS. 3A-D and 4A-D, each radially outward facing portion 90-1, 90-2, 90-3, 90-4 may have a corresponding radially outward facing portion group alignment line 130-1, 130-2, 130-3, 130-4 that is defined through the center of each filmhole of the radially outward facing portion 90-1, 90-2, 90-3, 90-4. Moreover, each radially inward facing portion 92-1, 92-2, 92-3, 92-4 may have a corresponding radially inward facing portion group alignment line 140-1, 140-2, 140-3, 140-4 that is defined through the center of each filmhole of the radially inward facing portion 92-1, 92-2, 92-3, 92-4. The radially outward facing portion group alignment line 130-1, 130-2, 130-3, 130-4 and the radially inward facing portion group alignment line 140-1, 140-2, 140-3, 140-4 of a filmrow 55-1, 55-2, 55-3, 55-4, may comprise parallel lines extending radially outward relative to the engine central longitudinal axis, or may comprise coincident lines extending radially outward relative to the engine central longitudinal axis, or may comprise any orientation as desired. In various embodiments, a group alignment line may comprise an arcuate alignment line, such as may have a point of inflection at the center of the associated radially outward facing portion or radially inward facing portion, or may have a point of inflection outside the associated radially outward facing portion or radially inward facing portion, or may have no point of inflection. Each transition region filmhole group 95-1, 95-2, 95-3, 95-4 may also have a transition region portion group alignment line 150-1, 150-2, 150-3, 150-4 that is defined through the center of each filmhole of the transition region filmhole group 95-1, 95-2, 95-3, 95-4. The transition region portion group alignment line 150-1, 150-2, 150-3, 150-4 may extend generally radially outward relative to the engine central longitudinal axis. The transition region portion group alignment line may comprise a linear line, or an arcuate line, or any orientation as desired. In various embodiments, the transition region portion group alignment line may have a point of inflection at the center of the associated transition region, or may have a point of inflection outside the associated transition region, or may have no point of inflection. The radially outward facing portion 90-1, 90-2, 90-3, 90-4 may be offset relative to the corresponding radially inward facing portion 92-1, 92-2, 92-3, 92-4 of the same filmrow 55-1, 55-2, 55-3, 55-4. In such embodiments, the transition region portion group alignment line 150-1, 150-2, 150-3, 150-4 may coincide with one, but not both, of the radially inward facing portion group alignment line 140-1, 140-2, 140-3, 140-4 and radially outward facing portion group alignment line 130-1, 130-2, 130-3, 130-4. In this manner, each transition region filmhole group 95-1, 95-2, 95-3, and 95-4 of a filmrow 55-1, 55-2, 55-3, 55-4 may comprise filmholes disposed radially outward of the radially innermost filmhole of one of the corresponding radially inward facing portion 92-1, 92-2, 92-3, 92-4 or may comprise filmholes disposed radially inward of the radially outermost filmhole of the radially outward facing portion 90-1, 90-2, 90-3, 90-4 of each filmrow 55-1, 55-2, 55-3, 55-4, resulting in the transition region filmholes radially overlapping at least one of the first and second group of holes.

In further embodiments, the radially outward facing portion 90-1, 90-2, 90-3, 90-4 is collinear relative to the corresponding radially inward facing portion 92-1, 92-2, 92-3, 92-4 of the same filmrow 55-1, 55-2, 55-3, 55-4. In such embodiments, the transition region portion group alignment line 150-1, 150-2, 150-3, 150-4 may be offset relative to both of the radially inward facing portion group alignment line 140-1, 140-2, 140-3, 140-4 and radially outward facing portion group alignment line 130-1, 130-2, 130-3, 130-4. In this manner, each transition region filmhole group 95-1, 95-2, 95-3, and 95-4 of a filmrow 55-1, 55-2, 55-3, 55-4 may comprise filmholes disposed overlapping the mesial ends of the corresponding radially inward facing portion 92-1, 92-2, 92-3, 92-4 and the radially outward facing portion 90-1, 90-2, 90-3, 90-4 of each filmrow 55-1, 55-2, 55-3, 55-4, resulting in the transition region filmholes radially overlapping both the first and second group of holes.

In various embodiments, each radially outward facing portion 90-1, 90-2, 90-3, 90-4, is disposed radially inward of each corresponding radially inward facing portion 92-1, 92-2, 92-3, 92-4. However, in various embodiments, each radially outward facing portion may be disposed radially outward of each corresponding radially inward facing portion. In various embodiments, the radially outward facing portion may be disposed radially outward of a corresponding radially inward facing portion of one adjacent filmrow, and radially inward of another adjacent filmrow. Each transition region filmhole group 95-1, 95-2, 95-3, and 95-4 may be disposed in the transition region 110-1, 110-2, 110-3, 110-4 of the corresponding filmrow. Thus, various arrangements are contemplated as desired to facilitate substantially adequate convective and film cooling of the airfoil.

With reference to FIGS. 1-4D, having discussed aspects of an airfoil 100 such as a stator vane 60 and a rotor blade 70, an airfoil 100 may be made of various materials. For instance, an airfoil 100 may be made of a single material, or different materials, or combinations of materials. For example, components of the system are made from metal. For example, aspects of an airfoil 100 are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight. Portions of an airfoil 100 as disclosed herein are optionally made of different materials or combinations of materials, and/or comprise coatings. Moreover, components of the airfoil 100 are in some instances mixtures of different materials according to different ratios, gradients, and the like.

An airfoil 100 thus has multiple materials, or any material configuration suitable to enhance or reinforce the resiliency and/or support of the system when subjected to wear in an aircraft operating environment or to satisfy other desired electromagnetic, chemical, physical, or material properties, for example coefficient of thermal expansion, ductility, weight, flexibility, strength, or heat tolerance.

One such material is an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An airfoil comprising an overlapping herringbone filmhole pattern, wherein the overlapping herringbone filmhole pattern comprises a first filmrow comprising:
    a first radially outward facing portion comprising filmholes oriented to direct cooling air leaving the filmholes radially outward of an engine central longitudinal axis and over a surface of the airfoil;
    a first radially inward facing portion comprising filmholes oriented to direct cooling air leaving the filmholes radially inward toward the engine central longitudinal axis and over the surface of the airfoil;
    a first transition region comprising a first region at least one of equidistant from distal ends, centered relative to mesial ends, or radially overlapping the mesial ends of the first radially outward facing portion and the first radially inward facing portion; and
    a first transition region filmhole group located in the first transition region, wherein the first transition region filmhole group comprises filmholes oriented to direct cooling air leaving the filmholes at least one of radially outward or radially inward relative to the engine central longitudinal axis and over the surface of the airfoil;
    wherein a majority of filmholes of the first radially outward facing portion are radially inward relative to a majority of filmholes of the first radially inward facing portion, wherein the first radially outward facing portion is staggered relative to the first radially inward facing portion or the first transition region.

2. The airfoil according to claim 1, wherein the first transition region filmhole group is collinear with the first radially outward facing portion.

3. The airfoil according to claim 1, wherein the first transition region filmhole group is collinear with the first radially inward facing portion.

4. The airfoil according to claim 1,
    wherein a first radially outward facing portion group alignment line is defined through a center of each filmhole of the first radially outward facing portion,
    wherein a first radially inward facing portion group alignment line is defined through a center of each filmhole of the first radially inward facing portion,
    wherein a first transition region filmhole group alignment line is defined through a center of each filmhole of the first transition region filmhole group,
    wherein the first radially inward facing portion group alignment line is parallel to the first radially outward facing portion group alignment line, and
    wherein the first transition region filmhole group alignment line is coincident with the first radially inward facing portion group alignment line and is parallel to the first radially outward facing portion group alignment line.

5. The airfoil according to claim 1,
    wherein a first radially outward facing portion group alignment line is defined through a center of each filmhole of the first radially outward facing portion,
    wherein a first radially inward facing portion group alignment line is defined through a center of each filmhole of the first radially inward facing portion,
    wherein a first transition region filmhole group alignment line is defined through a center of each filmhole of the first transition region filmhole group, wherein the first radially inward facing portion group alignment line is parallel to the first radially outward facing portion group alignment line, and wherein the first transition region filmhole group alignment line is coincident with the first radially outward facing portion group alignment line and is parallel to the first radially inward facing portion group alignment line.

6. The airfoil according to claim 1, wherein the airfoil comprises a stator vane.

7. The airfoil according to claim 1, wherein the airfoil comprises a rotor blade.

8. An airfoil comprising an overlapping herringbone filmhole pattern, the overlapping herringbone filmhole pattern comprising a plurality of filmrows, each filmrow comprising a radially inward facing portion, a radially outward facing portion, and a transition region filmhole group that is collinear with at least one of the radially outward facing portion and the radially inward facing portion, wherein a majority of filmholes of the radially outward facing portion are radially inward relative to a majority of filmholes of the radially inward facing portion, wherein the radially outward facing portion is staggered relative to the radially inward facing portion.

9. The airfoil according to claim 8, wherein the transition region filmhole group is collinear with at least one of the radially outward facing portion and the radially inward facing portion.

10. The airfoil according to claim 8,
wherein a radially outward facing portion group alignment line is defined through a center of each filmhole of the radially outward facing portion,
wherein a radially inward facing portion group alignment line is defined through a center of each filmhole of the radially inward facing portion,
wherein a transition region filmhole group alignment line is defined through a center of each filmhole of the transition region filmhole group,
wherein the radially inward facing portion group alignment line is parallel to the radially outward facing portion group alignment line, and
wherein the transition region filmhole group alignment line is coincident with the radially inward facing portion group alignment line and is parallel to the radially outward facing portion group alignment line.

11. The airfoil according to claim 8,
wherein a radially outward facing portion group alignment line is defined through a center of each filmhole of the radially outward facing portion,
wherein a radially inward facing portion group alignment line is defined through a center of each filmhole of the radially inward facing portion,
wherein a transition region filmhole group alignment line is defined through a center of each filmhole of the transition region filmhole group,
wherein the radially inward facing portion group alignment line is parallel to the radially outward facing portion group alignment line, and
wherein the transition region filmhole group alignment line is coincident with the radially outward facing portion group alignment line and is parallel to the radially inward facing portion group alignment line.

12. The airfoil according to claim 8, wherein the airfoil comprises a stator vane.

13. The airfoil according to claim 8, wherein the airfoil comprises a rotor blade.

14. The airfoil according to claim 8,
wherein each filmrow comprises:
the radially outward facing portion, wherein the radially outward facing portion comprises filmholes oriented to direct cooling air leaving the filmholes radially outward of an engine central longitudinal axis and over a surface of the airfoil;
the radially inward facing portion, wherein the radially inward facing portion comprises filmholes oriented to direct cooling air leaving the filmholes radially inward toward the engine central longitudinal axis and over the surface of the airfoil;
a transition region comprising a first region equidistant from distal ends of the radially outward facing portion and the radially inward facing portion; and
the transition region filmhole group, wherein the transition region filmhole group is collinear with at least one of the radially outward facing portion and the radially inward facing portion and located in the transition region, wherein the transition region filmhole group comprises filmholes oriented to direct cooling air leaving the filmholes one of radially outward or radially inward relative to the engine central longitudinal axis and over the surface of the airfoil.

15. A method of forming an airfoil having an overlapping herringbone filmhole pattern in the airfoil comprising:
forming a first radially outward facing portion comprising filmholes oriented to direct cooling air leaving the filmholes radially outward of an engine central longitudinal axis and over a surface of the airfoil;
forming a first radially inward facing portion comprising filmholes oriented to direct cooling air leaving the filmholes radially inward toward the engine central longitudinal axis and over the surface of the airfoil; and
forming a first transition region filmhole group located in a first transition region, wherein the first transition region filmhole group comprises filmholes oriented to direct cooling air leaving the filmholes at least one of radially outward or radially inward relative to the engine central longitudinal axis and over the surface of the airfoil;
wherein a majority of filmholes of the first radially outward facing portion are radially inward relative to a majority of filmholes of the first radially inward facing portion, wherein the first radially outward facing portion is staggered relative to the first radially inward facing portion or the first transition region.

16. The method according to claim 15,
wherein the first transition region film hole group is collinear with at least one of the first radially outward facing portion and the first radially inward facing portion, and
wherein the first transition region comprises a first region at least one of equidistant from distal ends, centered relative to mesial ends, or radially overlapping the mesial ends of the first radially outward facing portion and the first radially inward facing portion.

17. The method according to claim 15, wherein the first transition region filmhole group is collinear with at least one of: the first radially outward facing portion and the first radially inward facing portion.

18. The method according to claim 15,
wherein a first radially outward facing portion group alignment line is defined through a center of each filmhole of the first radially outward facing portion, wherein a first radially inward facing portion group alignment line is defined through a center of each filmhole of the first radially inward facing portion, wherein a first transition region filmhole group alignment line is defined through a center of each filmhole of the first transition region filmhole group, wherein the first radially inward facing portion group alignment line is parallel to the first radially outward facing portion group alignment line, and wherein the first transition region filmhole group alignment line is coincident with the first radially inward facing portion group alignment line and is parallel to the first radially outward facing portion group alignment line.

19. The method according to claim 15, wherein a first radially outward facing portion group alignment line is defined through a center of each filmhole of the first radially outward facing portion, wherein a first radially inward facing portion group alignment line is defined through a center of each filmhole of the first radially inward facing portion, wherein a first transition region filmhole group alignment line is defined through a center of each filmhole of the first transition region filmhole group, wherein the first radially inward facing portion group alignment line is parallel to the first radially outward facing portion group alignment line, and wherein the first transition region filmhole group alignment line is coincident with the first radially outward facing portion group alignment line and is parallel to the first radially inward facing portion group alignment line.

\* \* \* \* \*